(12) United States Patent
Feller et al.

(10) Patent No.: US 11,077,608 B2
(45) Date of Patent: *Aug. 3, 2021

(54) ENHANCING ADHESION OF OBJECTS TO CARRIERS DURING ADDITIVE MANUFACTURING

(71) Applicant: Carbon, Inc., Redwood City, CA (US)

(72) Inventors: Bob E. Feller, San Mateo, CA (US); Kyle Laaker, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/963,599

(22) PCT Filed: Feb. 21, 2019

(86) PCT No.: PCT/US2019/018954
§ 371 (c)(1),
(2) Date: Jul. 21, 2020

(87) PCT Pub. No.: WO2019/165070
PCT Pub. Date: Aug. 29, 2019

(65) Prior Publication Data
US 2021/0008794 A1 Jan. 14, 2021

Related U.S. Application Data (60) Provisional application No. 62/633,197, filed on Feb. 21, 2018, provisional application No. 62/649,280, filed on Mar. 28, 2018.

(51) Int. Cl.
*B29C 64/129* (2017.01)
*B29C 64/264* (2017.01)
(Continued)

(52) U.S. Cl.
CPC .......... *B29C 64/129* (2017.08); *B29C 64/188* (2017.08); *B29C 64/245* (2017.08);
(Continued)

(58) Field of Classification Search
CPC .................................................. B29C 64/135
See application file for complete search history.

(56) References Cited

U.S. PATENT DOCUMENTS 4,785,075 A 11/1988 Shimp
5,059,359 A * 10/1991 Hull ...................... B33Y 50/00
264/401
(Continued)

FOREIGN PATENT DOCUMENTS

WO 0172501 A1 10/2001
WO 02/30655 5/2003
(Continued)

OTHER PUBLICATIONS

International Preliminary Report on Patentability for PCT/US2019/018954 dated Jul. 23, 2020, 12 pages.
(Continued)

*Primary Examiner* — Timothy Kennedy
(74) *Attorney, Agent, or Firm* — Myers Bigel, P.A.

(57) ABSTRACT

A method of making a three-dimensional object from a light polymerizable resin, includes the steps of: (a) producing an object adhered to a carrier plate by light polymerization of the resin in a bottom-up stereolithography process (e.g., continuous liquid interface production); (i) the object including a carrier plate adhesion portion, a main body portion, and a circumferential boundary portion included in the carrier plate adhesion portion and optionally extending into at least part of the main body portion; (ii) the stereolithography process including overexposing the boundary portion (as compared to the exposure of the adhesion portion or main
(Continued)

body portion) with light; (b) optionally cleaning the object; and then (c) optionally baking the object to produce a further cured three-dimensional object.

16 Claims, 4 Drawing Sheets

(51) Int. Cl.
*B29C 64/188* (2017.01)
*B29C 64/245* (2017.01)
*B29C 64/35* (2017.01)
*B33Y 10/00* (2015.01)
*B33Y 40/20* (2020.01)

(52) U.S. Cl.
CPC ............ *B29C 64/264* (2017.08); *B29C 64/35* (2017.08); *B33Y 10/00* (2014.12); *B33Y 40/20* (2020.01)

(56) References Cited

U.S. PATENT DOCUMENTS

| | | |
|---|---|---|
| 5,122,441 A | 6/1992 | Lawton et al. |
| 5,196,137 A | 3/1993 | Merchant |
| 5,236,637 A | 8/1993 | Hull |
| 5,391,072 A | 2/1995 | Lawton et al. |
| 5,506,007 A | 4/1996 | Williams et al. |
| 5,529,473 A | 6/1996 | Lawton et al. |
| 5,773,403 A | 6/1998 | Hijino et al. |
| 5,824,259 A * | 10/1998 | Allanic ................. B29C 64/135 264/401 |
| 5,824,634 A | 10/1998 | Merchant |
| 6,008,179 A | 12/1999 | Flynn et al. |
| 6,063,206 A | 5/2000 | Latta |
| 6,288,018 B1 | 9/2001 | Flynn et al. |
| 6,426,327 B1 | 7/2002 | Flynn et al. |
| 6,646,020 B2 | 11/2003 | Nyberg et al. |
| 6,689,734 B2 | 2/2004 | Doyel et al. |
| 6,699,829 B2 | 3/2004 | Doyel et al. |
| 6,753,304 B1 | 6/2004 | Barthelemy et al. |
| 7,183,248 B2 | 2/2007 | Manning |
| 7,328,077 B2 | 2/2008 | Durbin et al. |
| 7,438,846 B2 | 10/2008 | John |
| 7,481,647 B2 | 1/2009 | Sambu et al. |
| 7,709,544 B2 | 5/2010 | Doyle et al. |
| 7,845,930 B2 | 12/2010 | Shkolnik et al. |
| 7,892,474 B2 | 2/2011 | Shkolnik et al. |
| 7,897,558 B1 | 3/2011 | Arafat |
| 8,110,135 B2 | 2/2012 | El-Siblani |
| 8,738,340 B2 | 5/2014 | Dunne et al. |
| 8,765,108 B2 | 7/2014 | Lalleman |
| 9,023,782 B2 | 5/2015 | Peitersen et al. |
| 9,068,152 B2 | 6/2015 | Klinkhammer et al. |
| 9,095,787 B2 | 8/2015 | Panandiker et al. |
| 9,120,997 B2 | 9/2015 | Sadlowski et al. |
| 9,121,000 B2 | 9/2015 | Burkinshaw et al. |
| 9,175,248 B2 | 11/2015 | Klinkhammer et al. |
| 9,198,847 B2 | 12/2015 | Peffly et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,360,757 B2 | 6/2016 | Desimone et al. |
| 9,375,298 B2 | 6/2016 | Boronkay et al. |
| 9,453,142 B2 | 9/2016 | Rolland et al. |
| 9,498,920 B2 | 11/2016 | Desimone et al. |
| 9,598,606 B2 | 3/2017 | Rolland et al. |
| 9,676,963 B2 | 6/2017 | Rolland et al. |
| 9,993,974 B2 | 6/2018 | Desimone et al. |
| 10,016,938 B2 | 7/2018 | Desimone et al. |
| 10,093,064 B2 | 10/2018 | Desimone et al. |
| 10,144,181 B2 | 12/2018 | Desimone et al. |
| 10,150,253 B2 | 12/2018 | Desimone et al. |
| 10,596,755 B2 | 3/2020 | Desimone et al. |
| 10,618,215 B2 | 4/2020 | Desimone et al. |
| 2003/0198824 A1 | 10/2003 | Fong et al. |
| 2009/0130449 A1* | 5/2009 | El-Siblani ............. G03F 7/0037 428/409 |
| 2010/0249979 A1 | 9/2010 | El-Siblani et al. |
| 2011/0089610 A1 | 4/2011 | El-Siblani et al. |
| 2013/0292862 A1 | 11/2013 | Joyce |
| 2013/0295212 A1* | 11/2013 | Chen ..................... B29C 64/129 425/150 |
| 2015/0331402 A1 | 11/2015 | Lin et al. |
| 2015/0360419 A1 | 12/2015 | Willis et al. |
| 2016/0303793 A1 | 10/2016 | Ermoshkin et al. |
| 2017/0102679 A1 | 4/2017 | Greene et al. |
| 2017/0129167 A1 | 5/2017 | Castanon |
| 2017/0129169 A1 | 5/2017 | Batchelder et al. |
| 2018/0126630 A1 | 5/2018 | Panzer et al. |
| 2018/0243976 A1 | 8/2018 | Feller |
| 2018/0290374 A1 | 10/2018 | Willis et al. |
| 2019/0126547 A1 | 5/2019 | Desimone et al. |
| 2019/0389127 A1 | 12/2019 | Desimone et al. |
| 2020/0139617 A1 | 5/2020 | Desimone et al. |

FOREIGN PATENT DOCUMENTS

| | | |
|---|---|---|
| WO | 2011086450 A2 | 7/2011 |
| WO | 2015164234 A1 | 10/2015 |
| WO | 2016133759 A1 | 8/2016 |
| WO | 2016145182 A1 | 9/2016 |
| WO | 2017/112751 | 6/2017 |
| WO | 2019/165052 | 8/2019 |

OTHER PUBLICATIONS

International Search Report and Written Opinion for PCT/US2019/018954 dated May 22, 2019, 12 pages.
Second Written Opinion for PCT/US2019/018954 dated Jan. 27, 2020, 6 pages.
Dendukuri, Dhananjay , et al., "Continuous-flow lithography for high-throughput microparticle synthesis", Nature Materials, 5, 2006, 365-369.
Dendukuri, Dhananjay , et al., "Stop-flow lithography in a microfluidic device", The Royal Society of Chemistry, Lab on a Chip, 7, 2007, 818-828.
Dendurkuri , et al., ", Modeling of Oxygen-Inhibited Free Radical Photopolymerization in PDMS Microfluidic Device, Macromolecules, 2008, 41 (22), 8547-8556, published Oct. 21, 2008".
Janusziewicz, Rima , et al., "Layerless fabrication with continuous liquid interface production", PNAS, 113, 2016, 11703-11708.
Morelli, Dean , "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.
Pan, Y , et al., "A Fast Mask Projection Stereolithography Process for Fabricating Digital Models in Minutes", J. Manufacturing Sci. and Eng. 134, Oct. 2012, 051011-1.
Poelma, Justin , et al., "Rethinking digital manufacturing with polymers", Science, 358(6369), 2017, 1384-1385.
Stern, S. A., "The 'Barrer' Permeability Unit", Journal of Polymer Science: Part A-2, 6(11), 1968, 1933-1934.
Tumbleston, John R., et al., "Continuous liquid interface production of 3D Objects", Science, 347(6228), 2015, 1349-1352.
Yasuda, H. , et al., "Permeability of Polymer Membranes to Dissolved Oxygen", Journal of Polymer Science, 4, 1966, 1314-1316.

* cited by examiner

ENHANCING ADHESION OF OBJECTS TO CARRIERS DURING ADDITIVE MANUFACTURING

RELATED APPLICATIONS

This application is a 35 U.S.C. § 371 national phase entry of International Application No. PCT/US2019/018954, filed Feb. 21, 2019, which claims the benefit of U.S. Provisional Patent Application Ser. Nos. 62/633,197, filed Feb. 21, 2018, and 62/649,280, filed Mar. 28, 2018, the disclosure of each of which is incorporated by reference herein in its entirety.

FIELD OF THE INVENTION

The present invention concerns methods of additive manufacturing, and particularly concerns methods of improving the adhesion of objects to carrier platforms during bottom-up stereolithography.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, Rethinking digital manufacturing with polymers, SCIENCE 358, 1384-1385 (15 Dec. 2017).

In bottom-up stereolithography techniques, the growing object is adhered to a carrier platform which is advanced away from the window during the production process. A problem with such techniques—particularly when operated at higher speeds, used to produce larger objects, or used with dual cure resins that sometimes produce a "green" object that is more fragile before its subsequent cure—is that adhesion of the object to the carrier platform can partly or fully fail during production. This results in the production of distorted or incomplete objects: neither of which are acceptable. Accordingly, new techniques for enhancing the adhesion of objects to carrier platforms are needed.

SUMMARY OF THE INVENTION

A method of making a three-dimensional object from a light polymerizable resin includes the steps of:

(a) producing an object adhered to a carrier plate by light polymerization of the resin in a bottom-up stereolithography process (e.g., continuous liquid interface production);
  (i) the object comprising a carrier plate adhesion portion, a main body portion, and a circumferential boundary portion included in the carrier plate adhesion portion and optionally extending into at least part of the main body portion;
  (ii) the stereolithography process including overexposing the boundary portion (as compared to the exposure of the adhesion portion or main body portion) with light;
(b) optionally cleaning the object (e.g., by wiping (including blowing), washing, or a combination thereof); and then
(c) optionally baking the object to produce a further cured three-dimensional object.

In some embodiments, the circumferential boundary portion is interrupted (e.g., perforated); in other embodiments, the circumferential boundary portion is uninterrupted.

In some embodiments, the circumferential boundary portion comprises a surface edge portion; in other embodiments, the circumferential boundary portion comprises an internal boundary portion; and in still other embodiments, the circumferential boundary portion comprises a combination of at least one surface edge portion and at least one internal boundary portion.

In some embodiments, the circumferential boundary portion is feathered in the Z dimension.

In some embodiments, the carrier plate adhesion portion has a surface area adhered to the carrier plate of from 1, 2, 3 or 4 square centimeters to 200 or 400 square centimeters, or more.

In some embodiments, the circumferential boundary portion has an average width (in the X-Y dimension) of from 0.1 or 0.5 millimeters to 10 or 20 millimeters.

In some embodiments, the carrier plate adhesion portion includes symbols and/or designs directly facing and/or contacting the carrier plate.

In some embodiments, the object main body portion comprises a lattice.

A further aspect of the invention is a product produced by a method as described herein.

While an important embodiment of the present invention includes the use of dual cure resins, such as those require a subsequent baking step to further cure the object, it will be appreciated that the present invention can be implemented with single cure (photopolymerized only) resins as well.

A. Ermoshkin, D. Shirvanyants, and J. Tumbleston, *Method of Additive Manufacturing by Fabrication through Multiple Zones*, US Patent Application Pub. No. US 2016/0303793 (Oct. 20, 2016), describes a bottom-up additive manufacturing method of an object through an adhesion segment, transition segment, and then body segment. However, overexposing a peripheral edge portion of an adhesion segment is neither suggested nor described. By overexposing the peripheral edge portion to facilitate adhesion, the potential for warping or curling of the object is reduced (e.g., when the object body comprises a lattice), features such as symbols or designs (including alphanumeric characters) that directly face the carrier platform surface resolve more clearly, and cure-through and overcure caused by overexposure are limited.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Production by Additive Manufacturing.

Resins including single cure and dual cure resins for additive manufacturing are known and described in, for example, J. DeSimone et al., U.S. Pat. No. 9,205,601; and in Rolland et al., U.S. Pat. Nos. 9,676,963; 9,598,606; and 9,453,142, the disclosures of which are incorporated herein by reference. Suitable examples of dual cure resins include, but are not limited to, resins for producing parts comprised of polymers such as: polyurethane, polyurea, and copolymers thereof; epoxy; cyanate ester, silicone, etc.

Techniques for additive manufacturing are known. Suitable techniques include bottom-up additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, PCT Application Nos. PCT/US2014/015486 (U.S. Pat. No. 9,211,678), PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, Science 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016). Other examples of methods and apparatus for carrying out particular embodiments of CLIP, or of additive manufacturing, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018).

After the intermediate three-dimensional object is formed, it is typically cleaned, and then further cured, preferably by baking (although further curing may in some embodiments be concurrent with the first cure, or may be by different mechanisms such as contacting to water, as described in U.S. Pat. No. 9,453,142 to Rolland et al.).

2. Cleaning/Washing.

Objects as described above can be cleaned in any suitable manner, such as by wiping (with a rigid or flexible wiper, fabric, or compressed gas such as compressed air), washing, or combinations thereof.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof. In some embodiments, a C1-C6 or C1-C4 aliphatic alcohol is preferred.

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR™ G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248, 6,063,206.

In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of 2-butoxyethanol, sodium metasilicate, and sodium hydroxide. One particular example thereof is PURPLE POWER® degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV® solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluoroether solvents that may be used to carry out the present invention include, but are not limited to, methyl nonafluorobutyl ether (HFE-7100™), methyl nonafluoroisobutyl ether (HFE-7100™), ethyl nonafluorobutyl ether (HFE-7200™), ethyl nonafluoroisobutyl ether (HFE-7200™), 1,1,2,2-tetrafluoroethyl-2,2,2-trifluoroethyl ether, etc., including mixtures thereof. Commercially available examples of this solvent include Novec® 7100 (3M), Novec® 7200 (3M).

Examples of volatile methylsiloxane solvents that may be used to carry out the present invention include, but are not limited to, hexamethyldisiloxane (OS-10™, Dow Corning), octamethyltrisiloxane (OS-20™, Dow Corning), decamethyltetrasiloxane (OS-30™, Dow Corning), etc., including mixtures thereof.

Other siloxane solvents (e.g., NAVSOLVE® solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

3. Further Curing/Baking.

After cleaning, the object is typically further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road, Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT™ inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

4. Overexposure of Edge Portions to Enhance Carrier Plate Adhesion.

Figure 1:
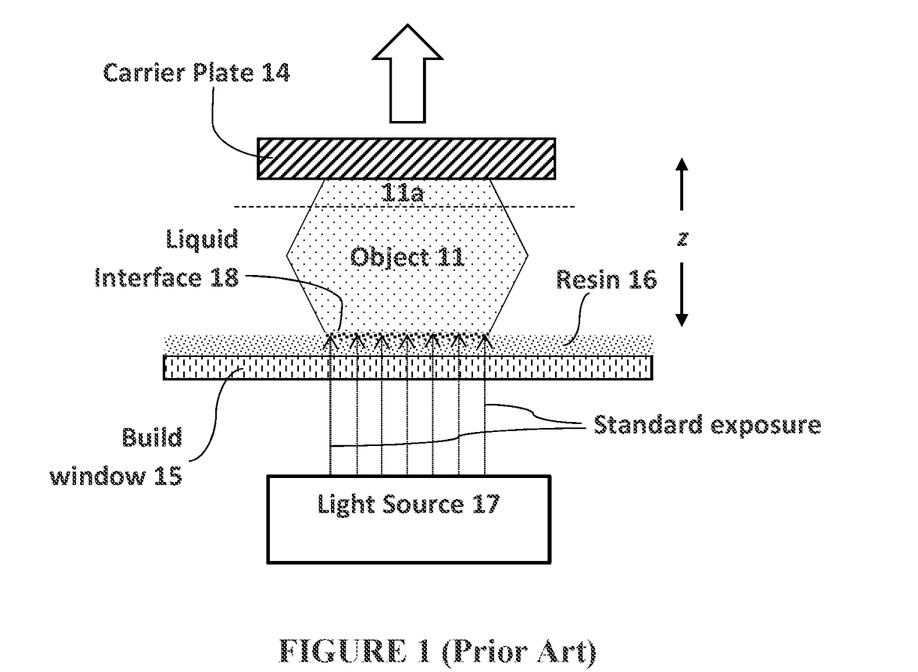
FIG. 1 is a side schematic view of an object being produced in accordance with the prior art.
Figure 1A:
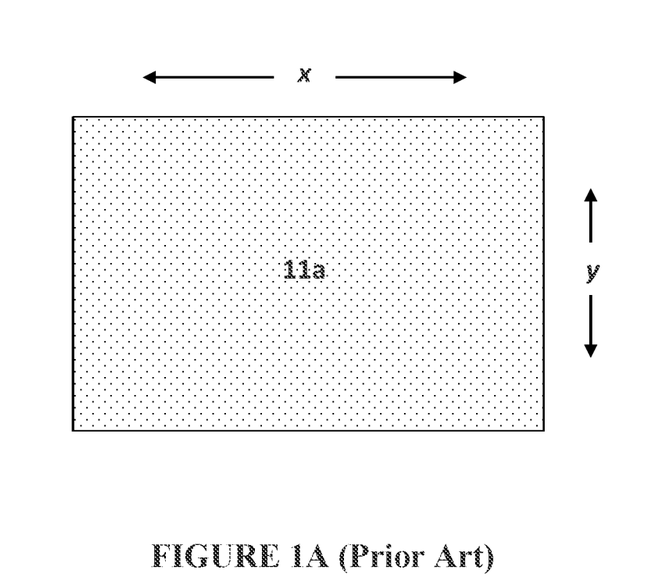
FIG. 1A is a top sectional view of an object produced as described in FIG. 1.

FIGS. 1-1A schematically illustrate a conventional approach for producing an object by bottom-up stereolithography, in which an object 11 is built between a carrier plate 14 and an optically transparent (to relevant wavelengths) window 15. The object includes an initial carrier plate adhesion region 11a that has a surface portion adhered to the carrier plate. A polymerizable liquid or resin 16 is placed on the window 15, through which patterned light is sequentially projected from a light source 17 to produce over time the object 11. In the various implementations of continuous liquid interface production (CLIP), a sustained liquid interface 18 is found between the object 11 and the resin 16 during production of some or all of the object 11. The sustained liquid interface may be created by any suitable technique, including but not limited to by the creation of a dead zone of unpolymerizable resin adjacent a window that is permeable to an inhibitor of polymerization (e.g., oxygen).

Figure 2:
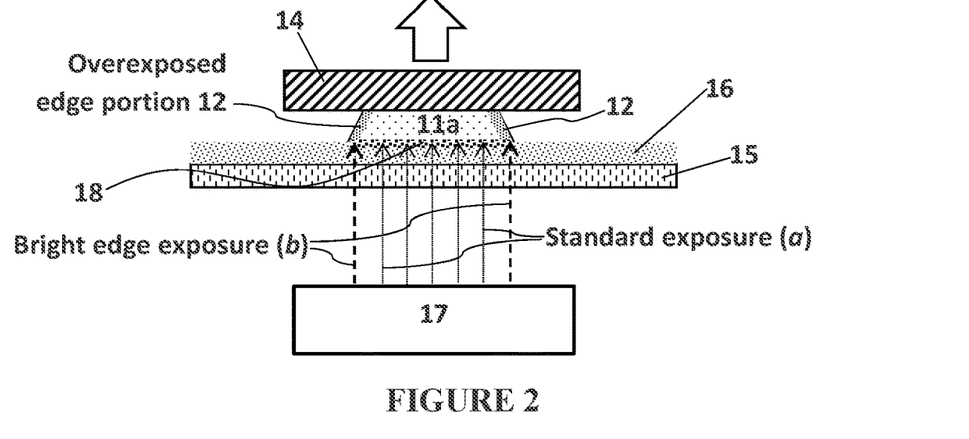
FIG. 2 is a side schematic view of an object being produced in accordance with the present invention.
Figure 2A:
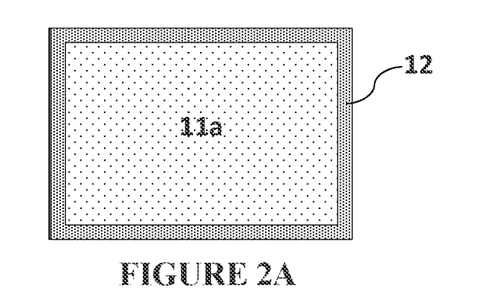
FIG. 2A is a top sectional view of an object produced as described in FIG. 2.
Figure 2B:
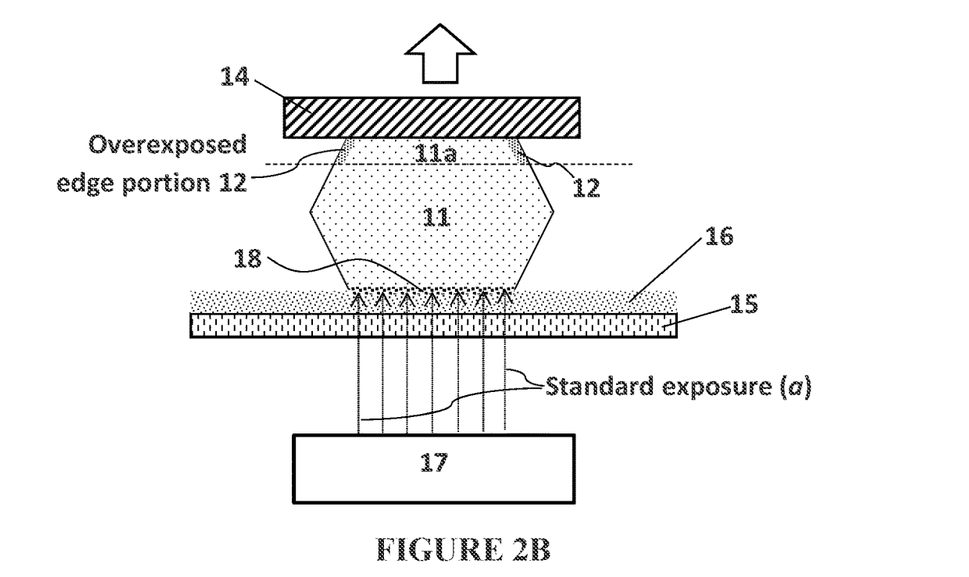
FIG. 2B is a side schematic view similar to FIG. 2, during a later stage of production of the object.

FIGS. 2, 2A, and 2B schematically illustrate an approach for producing an object in accordance with the present invention, in which a circumferential boundary or edge portion 12 of the object is overexposed by light during production of the carrier plate adhesion region 11a (that is, exposed to light at an intensity greater than that necessary to solidify or photopolymerize the resin). As shown in FIG. 2B, the overexposed circumferential edge portion 12 need not be continued from the adhesion region 11a into the main body or the object 11, though in some embodiments it may optionally do so.

Selection of an edge portion or a circumferential boundary portion may be carried out in accordance with known techniques. Edge detection is a well known operation in image processing, particularly for black and white images analogous to the sequential projections employed in stereolithography. It can be done a number of ways, but the most common way is by either "dilating" the image and subtracting the original or by eroding the image and subtracting this "eroded" image from the original. Once the edge has been found, the overexposure can be carried out in any manner, such as by dimming all of the other pixels and exposing the entire slice for a longer duration of time.

For example, where a portion of an image is represented as:

0 0 1 1 1 0 0 where 0 is black (no exposure) and 1 is white (standard exposure) for each adjacent pixel, the eroded image thereof is:

0 0 0 1 0 0 0

So if one wanted the edge portion to be two times brighter, one could dim the pixels still present in the eroded image by 0.5:

0 0 1 0.5 1 0 0 but expose that slice twice as long. This is readily expanded into 2 and 3 dimensions in accordance with known techniques.

Figure 3A:
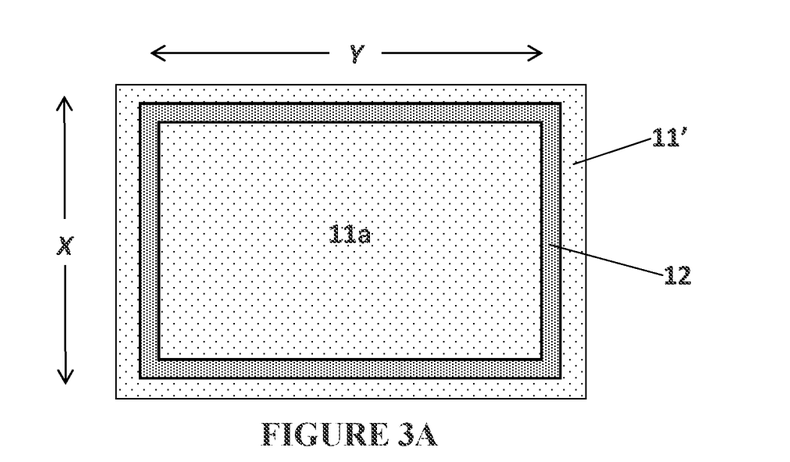
FIG. 3A is a top sectional view of an object similar to that of FIG. 2A, except that the circumferential boundary portion of the object adhesion region is internal within the object.
Figure 3B:
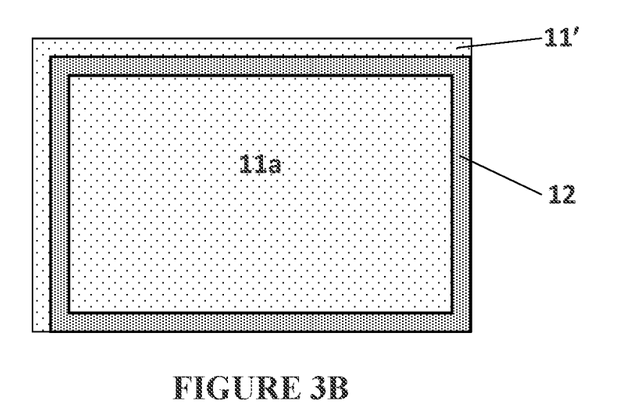
FIG. 3B is a top sectional view similar to FIG. 3A, except that the circumferential boundary portion of the object adhesion region is both external or surface in part, and internal in part.
Figure 3C:
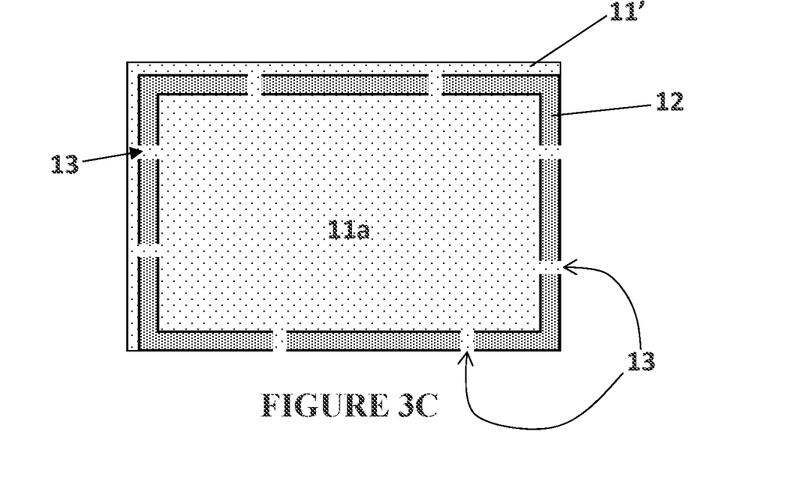
FIG. 3C is a top sectional view of an object similar to FIG. 3B, except that the circumferential boundary portion in the object adhesion region has interruptions or perforations included therein.

FIG. 3A shows an object similar to that of FIG. 2A, except that the circumferential border or boundary portion 12 is internalized just under an external surface or surface edge portion 11', as may be desired to keep a surface finish more constant, and/or enhance accuracy, depending upon the intended use and/or particular geometry of the object. FIG. 3B shows an object similar to FIGS. 2A and 3A, except that the circumferential border or boundary portion includes both an external edge or surface edge portion 11' and an internal boundary portion 12. FIG. 3C shows an object similar to FIG. 3B, except that now perforations or gaps 13 are included in the boundary portion 12. Gaps of various sizes and shapes may be included, so long as the boundary portion is still configured to enhance adhesion to the carrier plate and/or reduce distortion of the object, e.g, during subsequent curing steps.

Figure 4:
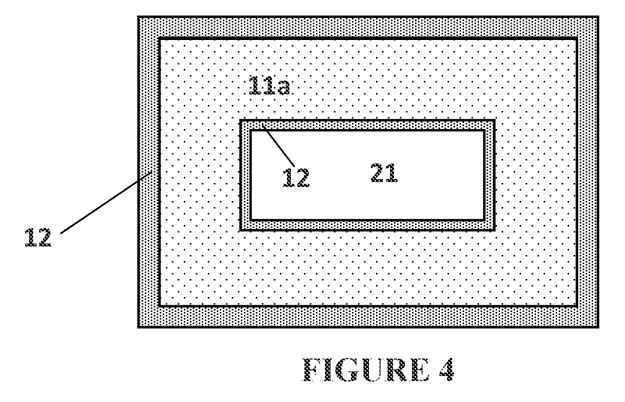
FIG. 4 is a top sectional view of an object similar to FIG. 2A, except that the object includes an internal cavity, and a circumferential boundary is included on the inside surface thereof as well as the outside surface thereof.
Figure 5:
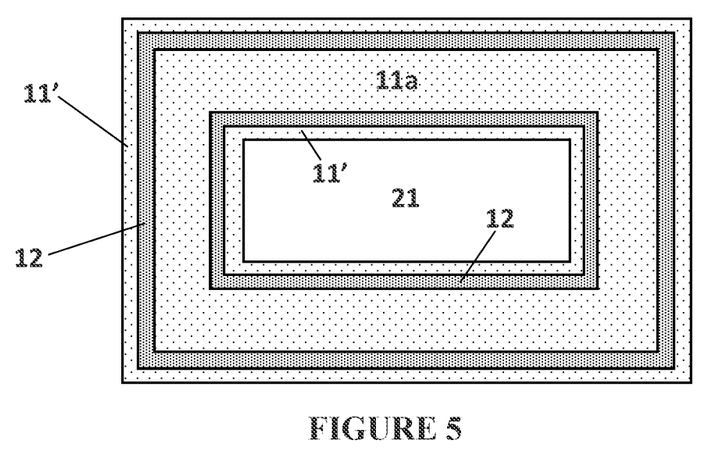
FIG. 5 is a top sectional view of an object similar to FIG. 4, except that the circumferential boundaries are now internal within the object, adjacent both the internal and external surfaces thereof.

FIGS. 4-5 are similar to FIGS. 2A-3C above, except that the object includes an internal cavity 21, and the overexposed edge portion or boundary portion 12 are included adjacent the cavity.

Figure 6A:
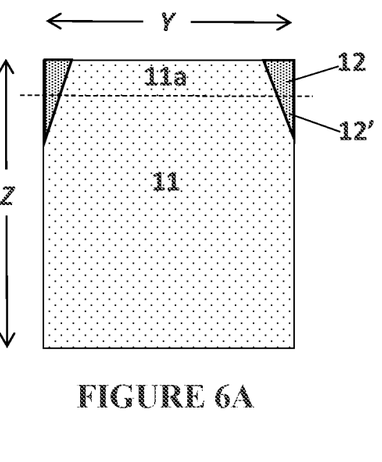
FIG. 6A is a side sectional view of an object similar to that shown being produced in FIG. 2, except that the peripheral edge in the object adhesion region is now feathered.
Figure 6B:
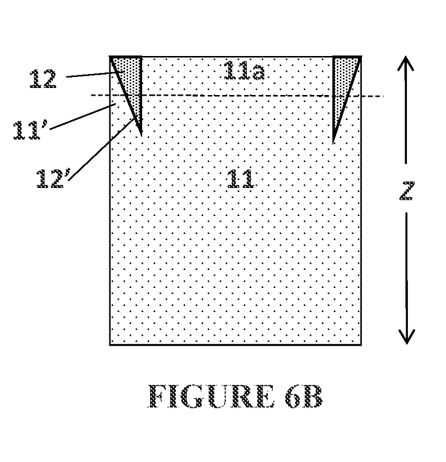
FIG. 6B is a side sectional view of an object similar to FIG. 6A, except that the feathered boundary portion is internal within the object, and the overexposed boundary portion extends only part way into the object.

FIGS. 6A-6B show side sectional views of an object produced in accordance with the invention, similar to what is shown in FIG. 2 above, except that the overexposed boundary portion now includes tapered or feathered portions 12' in the Z dimension.

The foregoing is illustrative of the present invention, and is not to be construed as limiting thereof. The invention is defined by the following claims, with equivalents of the claims to be included therein.

We claim:

1. A method of making a three-dimensional object from a light polymerizable resin, comprising the steps of:
   (a) producing an object adhered to a carrier plate by light polymerization of said resin in a bottom-up stereolithography process;
      (i) said object comprising a carrier plate adhesion portion, a main body portion, and a circumferential boundary portion included in said carrier plate adhesion portion;
      (ii) said stereolithography process including overexposing said boundary portion, as compared to the exposure of said adhesion portion or main body portion, with light to enhance adhesion of said object to said carrier plate during the bottom-up stereolithography process;
   (b) optionally cleaning said object; and then
   (c) optionally baking said object to produce a further cured three-dimensional object, wherein said circumferential boundary portion either (i) extends into only a part of said main body portion or (ii) does not extend into said main body portion.

2. The method of claim 1, wherein said resin comprises a dual cure resin, and said cleaning step (b) and said baking step (c) are included.

3. The method of claim 1, wherein said circumferential boundary portion is interrupted or perforated.

4. The method of claim 1, wherein said circumferential boundary portion is uninterrupted.

5. The method of claim 1, wherein said circumferential boundary portion comprises a surface edge portion.

6. The method of claim 1, wherein said circumferential boundary portion comprises an internal boundary portion.

7. The method of claim 1, wherein said circumferential boundary portion comprises a combination of at least one surface edge portion and at least one internal boundary portion.

8. The method of claim 1, wherein said circumferential boundary portion is feathered in the Z dimension.

9. The method of claim 1, wherein said cleaning step is carried out by wiping including blowing, washing, or a combination thereof.

10. The method of claim 1, wherein said carrier plate adhesion portion has a surface area adhered to said carrier plate of from 1 to 400 square centimeters.

11. The method of claim 1, wherein said circumferential boundary portion has an average width (in the X-Y dimension) of from 0.1 to 20 millimeters.

12. The method of claim 1, wherein said carrier plate adhesion portion includes symbols and/or designs directly facing and/or contacting said carrier plate.

13. The method of claim 1, wherein said object main body portion comprises a lattice.

14. The method of claim 1, wherein said circumferential boundary portion extends into only a part of said main body portion.

15. The method of claim 1, wherein said circumferential boundary portion does not extend into said main body portion.

16. The method of claim 1, wherein said bottom-up stereolithography process is carried out using continuous liquid interface production (CLIP).

* * * * *